United States Patent [19]

Alpar et al.

[11] Patent Number: 4,775,569

[45] Date of Patent: Oct. 4, 1988

[54] ANTISTATIC SLIP FILLED WITH FOAMED PIECES AND PROCESS OF MAKING SAME

[75] Inventors: Bela Alpar, Budapest; Lajos Katona, Gyor; Erzsebet Paal nee Trangoni; Imre Toth, both of Budapest; Dezso Varga, Tenyo, all of Hungary

[73] Assignee: Innovatext Kutato es Fejleszto Vallalat, Budapest, Hungary

[21] Appl. No.: 69,391

[22] Filed: Jul. 2, 1987

[51] Int. Cl.$^4$ .......................... B32B 1/00; B32B 3/10; B32B 9/00

[52] U.S. Cl. ...................... 428/71; 428/240; 428/283; 428/304.4; 428/316.6; 428/317.9; 428/327; 156/264

[58] Field of Search ...................... 428/68, 69, 71, 76, 428/160, 317.9, 316.6, 327, 158, 159, 240, 283, 304.4; 156/264

[56] References Cited

U.S. PATENT DOCUMENTS 3,900,648  8/1975  Smith .............................. 428/317.9
4,110,508  8/1978  Isgur et al. ........................ 428/240
4,304,824  12/1981  Karpinski .............................. 428/69

FOREIGN PATENT DOCUMENTS 1598436  9/1981  United Kingdom ................ 428/160

Primary Examiner—William J. Van Balen
Attorney, Agent, or Firm—Handal & Morofsky

[57] ABSTRACT

The invention relates to elastic padded, washable, antiseptic articles for personal use, particularly for therapeutic equipment, pillows, protective garments and similar objects. According to the invention idea, an antistatic slip of max. 20 kg/m$^3$ specific weight is filled with regularly cut, but irregularly arranged, static open cellular polyeter type pieces of polyurathane foam, the material of which is antiseptic.

The invention includes the production, characterized in that in the course of preparing the polyurathane foam, 0.4–1.6 weight % enzymatic decomposition-inhibiting additive is added to the polyol component. The block of foam is split up, then cut to pieces with rotary and/or swinging knives, and the static pieces are blown from the knives into the slip to be filled.

5 Claims, No Drawings

ANTISTATIC SLIP FILLED WITH FOAMED PIECES AND PROCESS OF MAKING SAME

The invention relates to elastic padded, washable, antiseptic articles for personal use, e.g. pillows, quilts, protective garment, etc., including the process for their production.

As known, various pillows, or pillowy therapeutic equipment are used in the therapeutics, the purpose of which is to provide comfort for the patients, but at the same time prevent bed-sore, alleviate the pains and facilitate the therapeutic work. These pillows may be used under the head, or lying on them and as therapeutic equipment other pillows are adapted to the shape of the body (e.g. hand-supportin pillow), The primary condition for the therapeutic equipment, e.g. pillows is to be light, elastic and washable as well as resistant to bacteria and mildews. These requirements apply to the bed-linen as well used in hotels, colleges and for the population.

Such protective garments are also known, the fundamental purpose of which is to provide protection against the ambient temperature, but at the same time they should be light, elastic, washable and antiseptic, Characteristically such protective garments are used by workers in refrigerating plants.

For this reason, the therapeutic equipment or in given case the protective garment stuffed with various foam rubbers, e.g. in case of pillows with chips of polyurathane foam. This solution however has several drawbacks.

One of them is that the chips are not polymerized, burnt wastes, which become easily pulverized while using, moreover they show a high tendency to pick up bacteria, and to become mouldy. By washing, these drawbacks are even more prominent, thus such appliance will get prematurely ruined. In any case, the washing—even in case of subsequent disinfection—does not provide immunization from bacteria and mildew.

A further, less known drawback is that harmful cyan compounds may be released from the residual isocyanate remaining in the unpolymerized foam, which will accelerate deterioration of the appliance.

An attempt was made to eliminate these drawbacks by—instead of using chips of polyurathane foam—cutting up 30 kg/m$^3$ or heavier polymerized material to rhomboidal pieces, which were filled into differently shaped pillow-cases. For the easy cutting and filling, these pieces were made to be antistatic, and the rhomboidal pieces arranged more or less regularly in the pillow-cases. During use, naturally, the regular arrangement became more or less irregular.

The padding of these pillows showed no tendency to fragmentation and pulverization, but in the course of usage—including the regular washing—the regularly arranged padding shifted, as a result of which the uniformly elastic surface could not be durably preserved, and after washing, or even upon the effect of perspiration, the pillows tended to be mouldy. Moreover these pillows endured only a moderate, max. 60° C. washing temperature without becoming damaged.

Similar problems appeared at the foams used for protective garment.

The invention is aimed at the elimination of these drawbacks and the realization of such article for personal use that is bacterium and fungus-repellent, furthermore washable and spin-dried with standard textile washing technology.

The invention is based on the following recognitions:

First of all it was recognized that the internal movement of the padding can be prevented by using foam of lower specific weight (kg/m$^3$) without becoming antistatic, and thus making use of its natural static effect, the antistatic slip is filled with pieces cut to regular shapes. The foam pieces will not be arranged regularly in the cases, but their permanent position in relation to each other is secured by the antistatic slip and the static, lighter and regular pieces of polyurathane foam.

According to a further recognition, so-called open cellular polyeter type polyurathane product was used, whereby washing at higher temperature is possible. Moreover, the open cellular material of lower specific weight creates softer feeling.

Finally it was recognized that mouldiness and the development of bacterium culture in the objects can be prevented by making the pieces antiseptic.

Accordingly the subject of the invention is is an elastic padded, washable, antiseptic article for personal use, particularly therapeutic equipment, pillow, protective garment and similar object, consisting of a slip and pieces of polyurathane foam in it, and it is characterized in that the slip is antistatic, whereas the polyurathane padding consists of static, open cellular polyurathane foam of max. 20 kg/m$^3$ specific weight cut to regular pieces, but arranged irregularly, the material of which is antiseptic. Suitably the slip is made to be antiseptic by conventional method.

The initial idea was to realize better arrangement and softer effect with material of lower specific weight, hence max. 20 kg/m$^3$ material was selected. Another objective of the invention was washing at as high teperature as possible. Both were accomplished by the open cellular foam texture.

The antiseptic (antibacterial, fungicide) effect of the foam was realized with additive mixed to the polyol, which prevents development of the bacterial and fungoid fostersoil by inhibiting the enzymatic decomposition process of the bacteria and fungi. These materials are conventional, available in the trade, e.g. by the trade name "Santized", from which about 0.4–1.6 weight % is added to the polyol component of the polyurathane production, and this way the polyurathane foam becomes antiseptic.

Originally the polyurathane foam is not static. However, in the process of cutting, it becomes static. Exactly this static effect is used for the adequately static padding.

In the process according to the invention, the block of foam prepared with antiseptic additive is first cut up to sheets with conventional method, then these sheets are cut up longitudinally and crosswise to pieces of nearly identical size, e.g. 10×6×4 mm with the aid of a suitable cutting machine, e.g. rotary or swinging knife. Meanwhile the static material from the knives is admitted into the slip (pillow-case, external part of the protective garment, etc.) with air current.

The slip is made of cotton or mixture of cotton and synthetic fibre, or in case of protective garment, it may be only synthetic fibre depending on its require purpose. Should it shown static characteristics due to the mixing or synthetic fibre, then it must be made antistatic by conventional method. Its antiseptic condition is also essential.

The solution according to the invention is highly suitable for the production of variously shaped elastic padded, washable antiseptic articles for personal use, particularly for therapeutic equipment, e.g. pillows, quilts and antiseptic protective garment (cost, waistecoat), or any other kind of objects, e.g. toys for children. These appliances create very soft effect and apart from being antiseptic, they can be regularly washed at about 90° C., without any damage to the padding. Hotels and other institutions may represent extensive field of application too.

What we claim is:

1. Elastic, padded, washable, antiseptic article for personal use, such as pillow, quilt, protective garment and similar object, comprising a slip and pieces of polyurethane foam in it, wherein the slip is antistatic and the polyurethane padding is of max. 20 kg/m$^3$ specific weight, cut to regular pieces and comprising irregularly arranged, static, open cellular pieces of polyurathane foam, made from an antiseptic material.

2. Article for personal use as claimed in claim 1, wherein the foampieces are hexagonal bodies of substantially identical size with cut surfaces.

3. Article for personal use as claimed in claim 1, wherein the slip is cotton and/or synthetic material made antistatic.

4. Process for the production of elastic, padded, washable, antiseptic article for personal use, such as pillow, quilt, protective garment and similar object, comprising a slip and pieces of polyurethane foam in it, where in the course of preparing the conventional polyurethane foam, 0.4–1.6 weight % enzymatic decomposition-inhibiting additive is added to the polyol component.

5. Process as claimed in claim 4, wherein the antiseptic, open cellular block of foam is first cut up to sheets, then it is cut to pieces suitably with rotary and/or swinging knives and the static pieces are admitted from the knives with air current into the slip to be filled.

* * * * *